(12) United States Patent
Dam et al.

(10) Patent No.: US 8,300,910 B2
(45) Date of Patent: Oct. 30, 2012

(54) PATHOLOGY INDICATING MEASURE RELATED TO CARTILAGE STRUCTURE AND AUTOMATIC QUANTIFICATION THEREOF

(75) Inventors: Erik B. Dam, København (DK); Arish Qazi, Brøndby Strand (DK); Morten Karsdal, København Ø (DK); Paola C. Petterson, Køge (DK); Mads Nielsen, Dragør (DK); Claus Christiansen, Morcote (CH)

(73) Assignee: Synarc Inc., Newark, CA (US)

( * ) Notice: Subject to any disclaimer, the term of this patent is extended or adjusted under 35 U.S.C. 154(b) by 588 days.

(21) Appl. No.: 12/311,153

(22) PCT Filed: Sep. 19, 2007

(86) PCT No.: PCT/EP2007/059899
§ 371 (c)(1),
(2), (4) Date: Jan. 22, 2010

(87) PCT Pub. No.: WO2008/034845
PCT Pub. Date: Mar. 27, 2008

(65) Prior Publication Data
US 2010/0220907 A1 Sep. 2, 2010

(30) Foreign Application Priority Data

Sep. 19, 2006 (GB) .................................. 0618417.0
Feb. 13, 2007 (GB) .................................. 0702777.4

(51) Int. Cl.
*G06K 9/00* (2006.01)
(52) U.S. Cl. ......... 382/128; 382/132; 382/278; 128/922
(58) Field of Classification Search .................. 382/128, 382/130, 131, 132, 278; 128/922
See application file for complete search history.

(56) References Cited

U.S. PATENT DOCUMENTS

| 5,533,519 | A   | * | 7/1996  | Radke et al.      | 600/595 |
| 6,537,233 | B1  | * | 3/2003  | Rangayyan et al.  | 600/586 |
| 7,141,026 | B2  | * | 11/2006 | Aminian et al.    | 600/595 |
| 7,239,908 | B1  | * | 7/2007  | Alexander et al.  | 600/427 |
| 8,036,729 | B2  | * | 10/2011 | Lang et al.       | 600/407 |

OTHER PUBLICATIONS

S. Arya et al., "An Optimal Algorithm for Approximate Nearest Neighbor Searching in Fixed Dimensions", *ACM-SIAM. Discrete Algorithms*, No. 5 (1994).
J.C. Buckland-Wright et al., "Fractal signature analysis measures cancellous bone organization in macroradiographs of patients with knee osteoarthritis", *Annal. of Rheumatological Diseases*, vol. 55, pp. 749-755 (1996).
C. Ding et al., "Knee cartilage defects: association with early radiographic osteoarthritis, decreased cartilage volume, increased joint surface area and type II collagen breakdown", *OsteoArthritis and Cartilage*, vol. 13, pp. 198-205 (2005).
T.C. Dunn et al., "T2 Relaxation Time of Cartilage at MR Imaging: Comparison with Severity of Knee Osteoarthritis", *Radiology*, 232(2), pp. 592-598 (2004).

(Continued)

*Primary Examiner* — Yosef Kassa
(74) *Attorney, Agent, or Firm* — Edwards Wildman Palmer LLP; Peter C. Lauro, Esq.

(57) ABSTRACT

A method for the analysis of three dimensional scan data representing an articular cartilage is provided to extract a quantitative parameter indicative of joint pathology. A measure representative of cartilage homogeneity is derived from this three dimensional image data. The measured value is compared with similar measured values previously established in respect of healthy joints and/or joints characterised by a pathology.

17 Claims, 10 Drawing Sheets

OTHER PUBLICATIONS

V. Grau et al., "Improved Watershed Transform for Medical Image Segmentation Using Prior Information", *IEEE Transactions on Medical Imaging*, 23(4), pp. 447-458 (2004).

R.M. Haralick et al., "Textural Features for Image Classification", *IEEE Transactions on Systems, Man. and Cybernetics SMC-3*, pp. 610-621 (1973).

G. Jones et al., "Early radiographic osteoarthritis is associated with substantial changes in cartilage volume and tibial bone surface area in both males and females", *OsteoArthritis and Cartilage*, vol. 12, pp. 169-174 (2004).

L. Kamibayashi et al., "Changes-in Mean Trabecular Orientation in the Medial Condyle of the Proximal Tibia in Osteoarthritis", *Calcif Tissue Int.*, 57(1), pp. 69-73 (1995).

J.H. Kellgren et al., "Radiological Assessment of Osteo-Arthrosis", *Ann. Rheum. Dis.*, 16(4), pp. 494-502 (1957).

S. Koo et al., "Considerations in measuring cartilage thickness using MRI: factors influencing reproducibility and accuracy", *OsteoArthritis and Cartilage*, vol. 13, pp. 782-789 (2005).

C. Liess et al., "Detection of changes in cartilage water content using MRI $T_2$-mapping in vivo", *Osteoarthritis and Cartilage*, vol. 10, pp. 907-913 (2002).

S. Lusse et al., "Evaluation of water content by spatially resolved transverse relaxation times of human articular cartilage", *Magnetic Resonance Imaging*, vol. 18, pp. 423-430 (2000).

J.A. Lynch et al., "Automating measurement of subtle changes in articular cartilage from MRI of the knee by combining 3D image registration and segmentation", *SPIE Medical Imaging*, vol. 4322, pp. 431-439 (2001).

T.J. Mosher et al., "Age Dependency of Cartilage Magnetic Resonance Imaging T2 Relaxation Times in Asymptomatic Women", *Arthritis & Rheumatism*, 50(9), pp. 2820-2828 (2004).

J.H. Naish et al., "A Method to Monitor Local Changes in MR Signal Intensity in Articular Cartilage: A Potential Marker for Cartilage Degeneration in Osteoarthritis", *MICCAI, LNCS 3217*, pp. 959-966 (2004).

S.K. Pakin et al., "Segmentation, Surface Extraction and Thickness Computation of Articular Cartilage", *SPIE, Medical Imaging*, vol. 4684, pp. 155-166 (2002).

H.E. Smith et al., "Spatial Cariation in Cartilage T2 of the Knee", *Journal of Magnetic Resonance Imaging*, vol. 14, pp. 50-55 (2001).

T. Stammberger et al., "Interobserver Reproducibility of Quantitative Cartilage Measurements: Comparison of B-Spline Snakes and Manual Segmentation", *Magnetic Resonance Imaging*, 17(7), pp. 1033-1042 (1999).

J.G. Tamez-Pena et al., "Knee Cartilage Extraction and Bone-Cartilage Interface Analysis from 3D MRI Data Sets", *SPIE Medical Imaging*, vol. 5370 (2004).

J. Hodler, M.D., et al., "Current status of imaging of articular cartilage", *International Skeletal Society*, 25(8), pp. 703-709 (1996).

B. Dardzinski, Ph.D., et al., "Spatial Variation of T2 in Human Articular Cartilage", *Radiology*, 205(2), pp. 546-550 (1997).

\* cited by examiner

PATHOLOGY INDICATING MEASURE RELATED TO CARTILAGE STRUCTURE AND AUTOMATIC QUANTIFICATION THEREOF

The present invention relates to a method for deriving a useful quantitative measure indicative of joint pathology from three dimensional scan data of a joint cartilage, e.g. of a knee joint, which may be useful in the diagnosis and prognosis of said pathology, especially of osteoarthritis.

Osteoarthritis (OA) affects the daily lives of the majority of the older part of the world population—for some by minor morning stiffness and for others to the degree of causing severe pain and reduced range of motion. Furthermore, even though promising new treatment possibilities are arising, a major, thoroughly documented breakthrough in effective treatment of OA beyond symptom control is still awaited. One limiting factor in the development and evaluation of new treatments is the effectiveness of the methods for quantification of disease progression in clinical studies.

Accuracy and precision of quantification methods are essential, together with the ability to monitor the actual progression of the disease. These factors, accuracy and precision (accuracy is used to mean correctness whereas precision is used for reproducibility), affect both the number of test subjects needed in a clinical study and the required duration of the study. In addition to accuracy and precision, there is very substantial value in automating quantification methods. Fully automatic (typically computer based) quantification methods by definition eliminate intra-observer variation and thereby potentially allow better precision. Furthermore, for studies based on medical imaging data (X-ray, MRI, CT, etc.), the load on the radiologists is potentially overwhelming—and increasingly so when morphometric measures in 3D are desired. Morphometric measures require fully segmented structures with anatomical correspondence defined. Thereby, computer-based methods can not only relieve the radiologists but also allow quantification measures that would otherwise be unfeasible in large-scale studies or simply even impossible.

In the detailed illustrative description of the present invention, we shall focus on quantification of articular knee cartilage from Magnetic Resonance Imaging (MRI) by way of example with particular reference to OA. This is without limitation of the general scope of the invention either as regards imaging technology, joint of interest, or relevant pathology but will aid ready understanding. MRI offers some obvious advantages compared to traditional X-ray based OA monitoring. First, the cartilage is visible.

Other methods exist for segmentation and quantification of articular cartilage from MRI data. However, to our knowledge, no other fully automatic method has been evaluated and published. In general, the MR based methods are more often evaluated for segmentation accuracy and precision rather than for morphometric quantification and ability to monitor OA progression.

A semi-automatic method based on watershed transformation and requiring 5-10 minutes of human interaction per knee is presented in (Grau, Mewes, Alcaniz, Kikinis & Warfield 2004) showing good segmentation performance on four knees.

Another method performs region growing based on voxel intensities from fused scans followed by classification and editing of the resulting regions requiring 10-40 minutes of human interaction per knee (Pakin, Tamez-Pena, Totterman & J. Parker 2002, Tamez-Pena, Barbu-McInnis & Totterman 2004). The method is sparsely evaluated but thickness measures repeated on the same scan results in a CV of 3.2% for the tibial medial compartment.

Also, some methods perform cartilage segmentation by slice-wise 2D segmentation (Stammberger, Eckstein, Michaelis, Englmeier & Reiser 1999, Lynch, Zaim, Zhao, Stork, Peterfy & Genant 2001). They rely on experts marking the cartilage sheet in most slices and thereby become quite time-consuming (about 2.5 hours per knee (Stammberger et al. 1999)). Furthermore, the resulting segmentations are less suitable for morphometric analysis.

The method from (Stammberger et al. 1999) is evaluated in (Koo, Gold & Andriacchi 2005) on four test subjects giving a coefficient of variation (CV) for cartilage thickness measurement of 6.6% for inter-observer variability and about 4% relative difference between measurements from repeated scans of a single test subject.

Another semi-automatic method based on region growing is used in (Ding, Garnero, Cicuttini, Scott, Cooley & Jones 2005) where they show that cartilage volume is significantly related to presence of cartilage defects in a study including 372 test subjects. Methods focusing on measurement of the joint space width from radiographs have been extensively evaluated in clinical studies.

WO03/012724 discusses automatic processing of scan images to extract measurements of biomarkers. Semi-automatic segmentation of images is described and an attempt is made to track biomarkers through time on subsequent scans. A large number of biomarkers are mentioned, including the signal intensity distribution within the cartilage layers. However, whilst it is indicated that it may be of interest to track changes in such structural measures through time, there is no suggestion that the value for a given patient at any one time could be compared in a diagnostically meaningful way with values from other individuals. There is no specific method for performing any quantification. There is moreover no clinical data provided to show that this parameter does actually change with disease progression. Accordingly, it cannot be deduced from this teaching that it would be diagnostic to compare a value of signal intensity distribution of a cartilage obtained from a patient to equivalent values established in respect of a population of pathology free individuals or a population of patients suffering from a cartilage pathology. Indeed, it is not even deducible from this teaching whether a higher or a lower value for such quantification should be regarded as more pathological.

Before the cartilage even starts to thin there are various biochemical changes undergoing in the cartilage. For example, during the early stages of OA the cartilage may swell up due to the inclusion of water. As a result, measuring volume at this stage may not be adequate.

In this respect, some changes in the cartilage structure have to be observed at microscopic scale, for example, loss of proteoglycan, loss of collagen type II, diminished water content, and early structural damage such as minor lesions are not directly visible at the macroscopic scale. Due to limitations in the available imaging resolution, these microscopic events will affect the intensities observed at MRI indirectly through partial volume effects.

Most research in MRI on quantitative imaging of cartilage quality has been focused towards developing specific pulse sequences where the resulting intensities are linked to the concentration of certain molecules (e.g. water) or certain proteins (e.g. proteoglycan or collagen). Thereby, a loss of concentration results in an overall darkening of the cartilage in the scan and the mean intensity can be used as a biomarker for monitoring the process.

The T2 relaxation time is one of the first structural biomarkers based on MRI. The T2 time is related to both collagen matrix organisation and water content. In (Lusse, S., Claassen, H., Gehrke, T., Hassenpflug, J., Schunke, M., Heller, M., Gluer, C. C.) they showed a correlation between T2 and water content on 3 subjects in vivo. In (Smith, H. E., Mosher, T. J., Dardzinski, B. F., Collins, B. G., Collins, C. M., Yang, Q. X., Schmithorst, V. J., Smith, M. B.) they investigated the spatial variation of T2 times from 3T scans on 15 healthy subjects and found higher T2 values near the articular surface—consistent with the structural cartilage layering. In (Liess, C., Lusse, S., Karger, N., Heller, M., Gluer, C.), they showed reduced T2 times after exercise on 20 healthy subjects—consistent with a loss of water content. Also, they showed a 5% loss of cartilage thickness as a result of the same exercise session. Finally, in (Mosher, T. J., Liu, Yi, Yang, Q. X., Yao, J., Smith, R., Dardzinski, B. J, Smith, M. B) they investigate 30 asymptomatic women using 3T scans. They showed increased T2 times for women over the age of 45—and in particular they investigated the location of the structural changes with results indicating that the age-related changes in cartilage structure begins at the articular surface and progresses to the deeper layers with advancing age.

The T2 relaxation time is not the only marker from relatively simple MRI sequences suitable for inspection of cartilage quality. The mean intensity across the entire cartilage sheet from a 3D spoiled gradient-echo fat suppression sequence (sagittal, 0.6 mm in-plane, 2 mm slice thickness, 1.5 T) was investigated in (Naish, J. H., Vincent, G., Bowes, M., Kothari, M., White, D., Waterton, J. C., Taylor, C. J.). The scan intensities were normalized in order to minimize scanner variation. They reported a 1% intensity decrease over a 1 year period ($p<0.01$) for a group of 50 OA subjects. This is related to loss of hydration, but since the GE signal is proportional to proton density but also affected by T1 and T2* it is not a specific marker for a single biological/chemical process. The method was not evaluated for the ability to quantify progression of OA.

According to the present invention, there is provided a method for the analysis of three dimensional image data representing an articular cartilage to extract a quantitative parameter indicative of joint pathology, which method comprises determining from the data a measure representative of cartilage homogeneity, and further comprising comparing the measured value for the joint with measured values previously established in respect of healthy joints and/or in respect of joints characterised by a pathology.

In the present invention, it has been realised that the early loss of integrity could be measured by quantifying the decrease in alignment of the collagen fibers in the three layers of the cartilage.

However, microscopic changes in the cartilage structure will not be directly visible in macroscopic medical scans, such as magnetic resonance images (MRI), however such changes will affect the intensity appearance in the scans.

Accordingly, and due to limitations in resolution and acquisition times, at this stage we settle for analysis of the intensities observed in regular magnetic resonance images (MRI) as a first step. Instead of measuring integrity of cartilage layer alignment directly, we therefore quantify the cartilage homogeneity by quantifying the intensity distribution of cartilage in a magnetic resonance image at macroscopic level.

It will be appreciated that the word "homogeneity" may be interpreted in several ways. The term homogeneity describes a specific equation that can quantify the spatial dependence of gray level values, as shown in (Haralick, R. M., Shanmugam, K., Dinstein, I.). Alternatively, the term homogeneity may be used as a general term for describing the uniformity of textural appearance of scan intensities. In the broader sense, the term embraces a number of mathematically defined measures of first order or higher orders (homogeneity in the narrower sense being one of these). Such homogeneity measures include entropy, as discussed in more detail below. This broader latter sense is usually intended where the phrase cartilage homogeneity is used in this specification. Where the specific mathematical definition is intended, the term is accompanied by the relevant formula.

Analysis of structure has previously been applied to anatomical structures other than cartilage. For example, the structure of trabecular bone can be quantified by fractal signature analysis as described in (Buckland-Wright, J., Lynch, J., Macfarlane, D.). This sort of analysis offers a means of detecting targets in background clutter that have similar spectral characteristics. Texture analysis has also been used for the measurement of osteoporosis progression analysis in the form of Minkowski functionals and scaling vectors. However, the thin cartilage structure with a typical thickness of only a few voxels complicates the analysis.

In an embodiment, the measure is representative of the homogeneity of measured intensities within a region of interest of the image. Various first and second order statistical methods may be used to approximate the probability of observing a particular intensity at a randomly chosen location. For example, to provide a measure representative of the homogeneity of the measured intensities, we can measure the mean (average intensity value), standard deviation (contrast of image) or uniformity (energy of image). Preferably, we measure the entropy (randomness) of the measured intensities in the image.

In an embodiment, the method further comprises partitioning the region of interest into at least two sub-regions and comparing the measured value representative of homogeneity obtained from the sub-region that has previously been found to best discriminate between healthy joints and joints characterised by a pathology.

Preferably, the method further comprises regularising data representative of said measured intensities within said region of interest to enhance measurements derived from said signals. There are three different regularisation approaches: the first approach regularises the partitioned regions by applying geometric curve evolution by iterating the median filter; the second approach uses binary morphological filtering on the regions and the third approach uses the concept of bootstrap sampling.

The region of interest is preferably selected such that it lies in a load bearing area of said cartilage. More preferably, a sub-region of interest is selected such that it is predominantly at the medial part of the medial tibial cartilage sheet (away from the centre of the knee). In particular, the region of interest is preferably all or some of (e.g. at least 50% or at least 75% of) that part of the cartilage that overlies and bears upon one of the two menisci of the knee joint. Preferably the region of interest is chosen such that at least 50%, more preferably at least 75%, most preferably at least 90% of the region of interest consists of areas of the cartilage that overly and bear upon one of the two menisci of the knee joint.

Whilst the invention is applicable to any joint cartilage, for instance cartilage of the hip joint, finger joints, vertebra cartilage, shoulder joints or elbow joints, the cartilage is preferably a knee cartilage, especially a tibial cartilage and more especially a medial tibial cartilage.

Preferably, a comparison of said quantitative parameter is made both with values of the quantitative parameter previously established in respect of healthy joints and with values of said quantitative parameter previously established in respect of joints characterised by a pathology.

In an embodiment, a comparison of said quantitative parameter is made with values of the quantitative parameter established in the same joint but at a subsequent period of time to enable an assessment of disease progression.

Said pathology is preferably osteoarthritis or rheumatoid arthritis, but may be pigmented villonodular synovitis, Lipoid dematoarthritis (Multicentric reticulohistiocytosis), Enteropathic arthritis, hemophilia (intraarticular bleeding), Gout, Familial Mediterranean fever, Pseudogout, Ochronotic arthropathy, Secondary OA, Syphilis (tabes dorsalis), Pyrogenic arthritis, Tuberculous arthritis or Fungal arthritis.

Whilst the invention is applicable to any 3-dimensional image data, however acquired, for instance from an NMR scan, or by X-ray tomography, it is preferred that said three dimensional scan data is produced by magnetic resonance imaging (MRI).

Although the invention has principally been defined as a method of extracting significant information from a digital image, it is of course equally applicable as an instruction set for a computer for carrying out a said method or as a suitably programmed computer.

The comparison step is preferably conducted making use of previous measurements on a healthy or diseased population of reference joints for which values or average values are stored in a database or memory location in such a computer. The computer may be programmed to display the results of the comparison as a read out.

The invention will be further described and illustrated with reference to specific embodiments thereof with reference being made to the accompanying drawings, in which.

Figure 12:
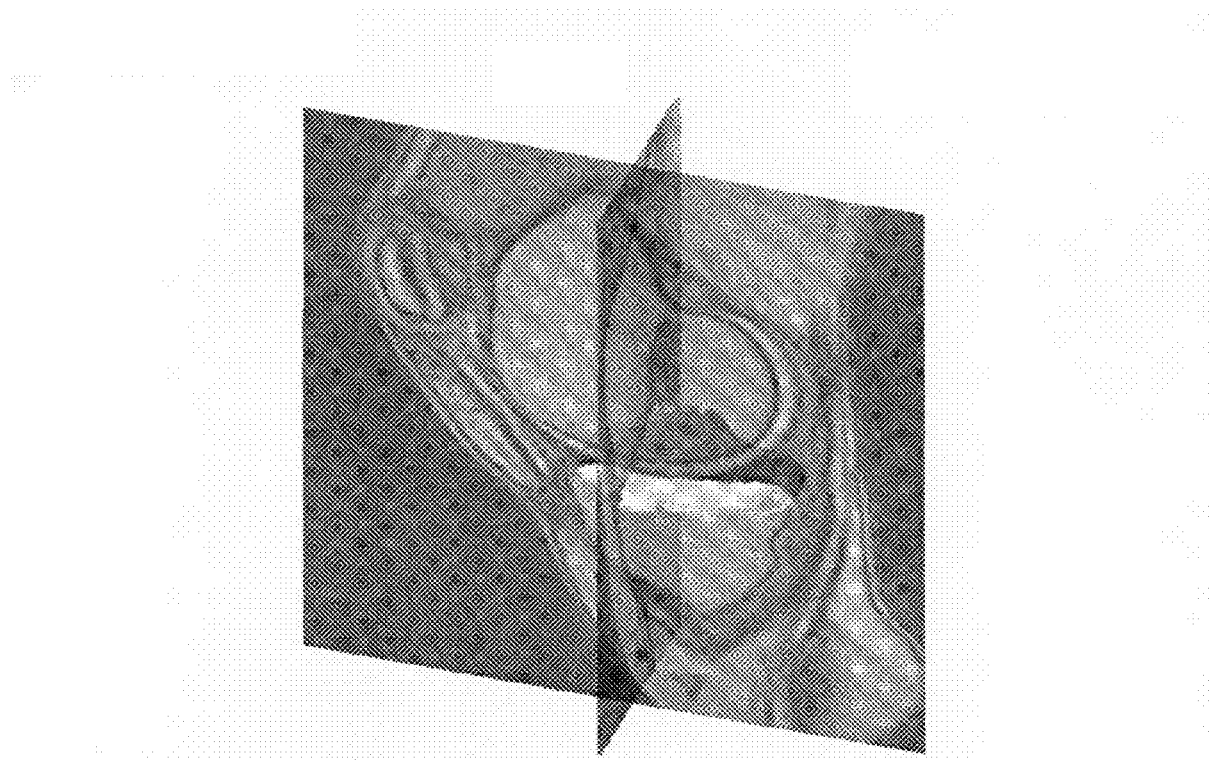
Figure 13:
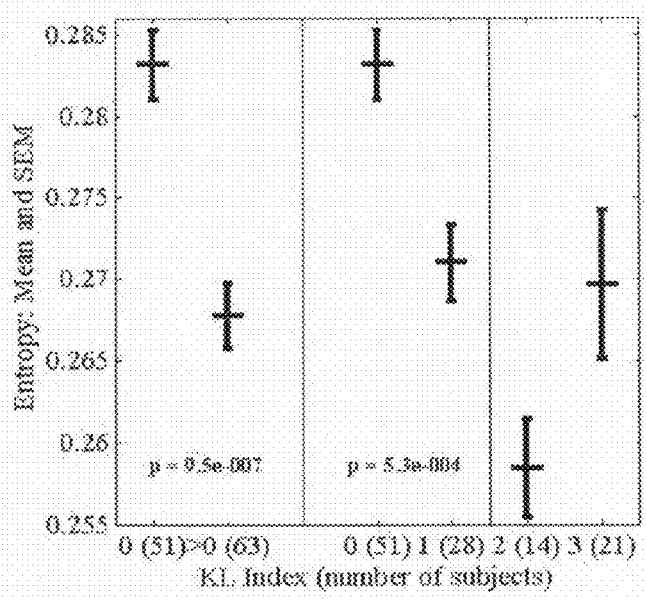
Figure 14:
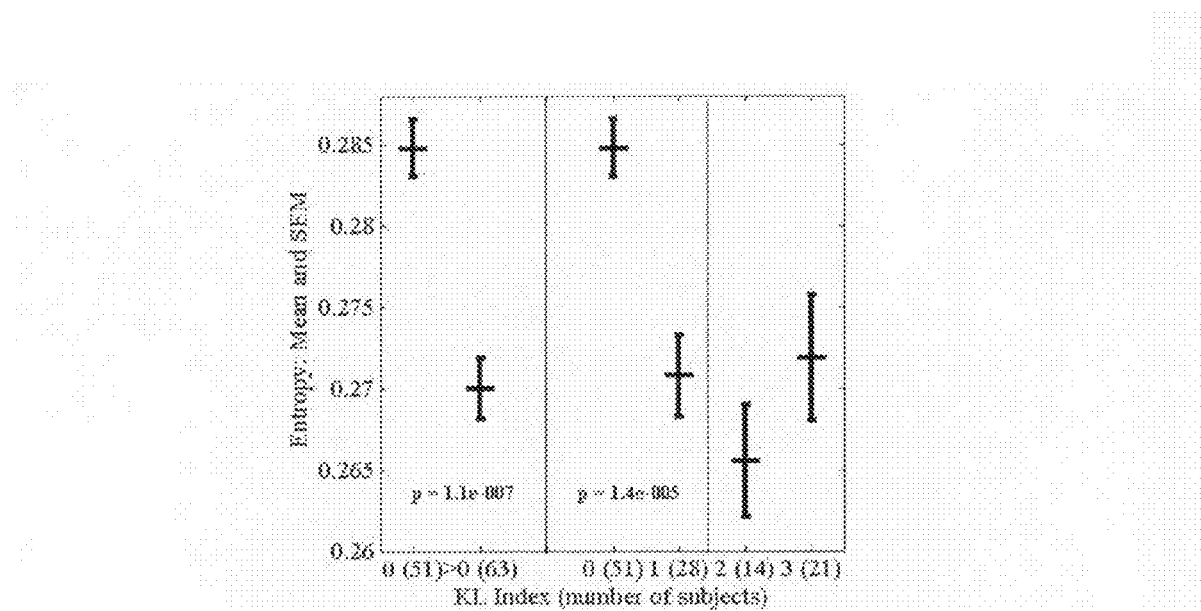
Figure 15:
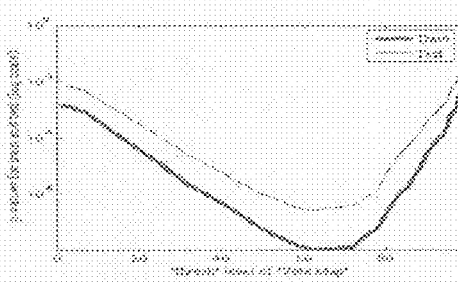
Figure 16:
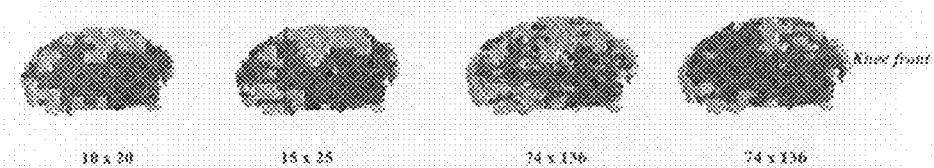
Figure 17:
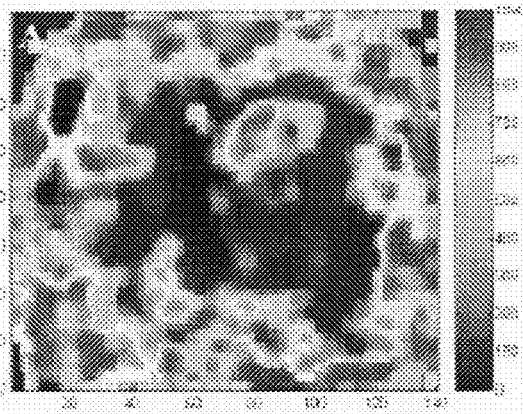
Figure 17:
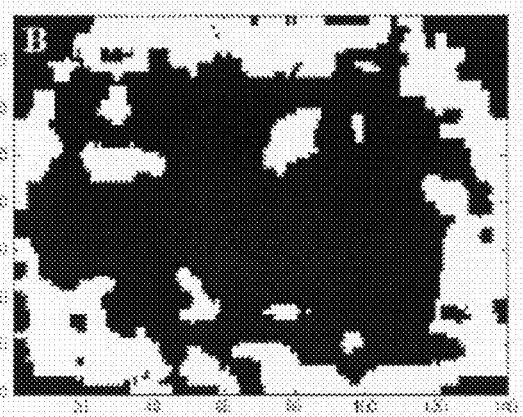
Figure 17:

FIGS. 11(a) to (e) show schematically different partitions of intensities of cartilage when separating healthy from OA;

FIG. 12 shows in 3D an image of the medial tibial cartilage sheet where the light region refers to the medial half which discriminates most;

FIG. 13 shows an error bar plot for entropy against KL index when using manual segmentations of the medial half of the medial tibial cartilage sheet;

FIG. 14 shows a corresponding bar plot for entropy against KL index when using automatic segmentations of the medial half of the medial tibial cartilage sheet;

FIG. 15 shows a plot of mean p-values for train and test for each level of a vote map;

FIG. 16 shows the partitioning algorithm of the present invention on an area of cartilage under different resolutions; and FIGS. 17 (a), (b) and (c) shows results obtained in an application of the invention to a larger set of knee scans.

As set out above, the present inventors have realised that the early loss of integrity in cartilage could be measured by quantifying the decrease in alignment of the collagen fibres in the three layers of an area of cartilage.

In order to quantify homogeneity, described below is a method of measuring various parameters related to the intensity of signals in an MRI scan, including measuring the mean signal intensity and entropy of the signal intensities, using a grey scale histogram, which in turn represents the distribution of intensities inside a region of cartilage. The results are then refined by determining the area of interest within the region of cartilage that provides the best indicator of osteo-arthritis.

Entropy is a measure of the information content or alternatively randomness of data. Calculating the entropy of the magnetic resonance intensities derived from a scan can be used to provide a measure of homogeneity in the cartilage of a joint.

We shall describe a specific embodiment of the invention starting from the taking of MRI scans of knees and working through the steps of voxel classification and quantification of diagnostic parameters.

An Esaote C-Span low-field 0.18 T scanner dedicated to imaging of extremities was used to acquire Turbo 3D T1 scans (40° flip angle, $T_R$ 50 ms, $T_E$ 16 ms). The scans were made through the sagittal plane with a voxel size in the range $0.7031 \times 0.7031 \times (0.7031/0.7813/0.8594)$ mm$^3$. The scans all had the size 256×256×104 voxels, but we only used the central 170×170×104 voxels because only they contained information.

Figure 1:
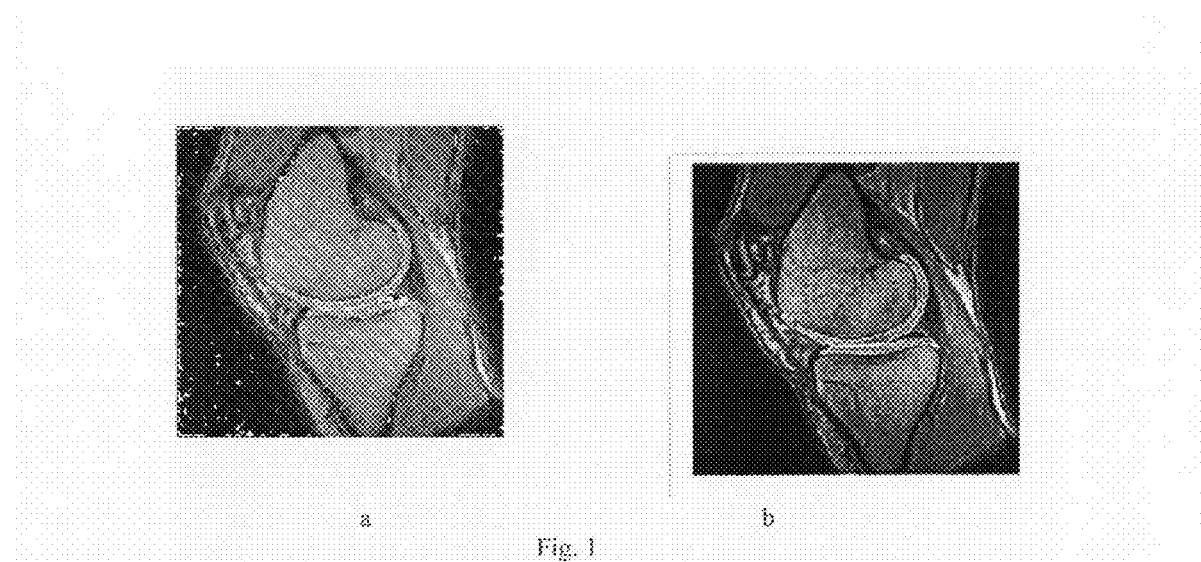
FIG. 1a shows an MRI scan slice with the tibial and femoral medial cartilage manually segmented.
FIG. 1b shows an MRI scan slice with the tibial and femoral medial cartilage automatically segmented.

For comparative purposes, the scans were manually segmented on a slice-by-slice basis by radiologists. A scan slice with the tibial and femoral medial cartilage manually segmented is shown in FIG. 1a. FIG. 1b shows the same image segmented automatically as described in detail below. The sensitivity and specificity for this scan are 92.52% and 99.82% respectively, with a dice similarity coefficient of 0.83.

For the segmentation of cartilage we use an approximate kNN classifier, which is implemented in an ANN (Approximate Nearest Neighbour) framework and developed by Mount and colleagues (Arya et al, 1994). The ANN classifier is in principle the same as a kNN classifier, but with the modification that one can allow for a small amount of error in the search for nearest neighbours which may improve the run time significantly. An error bound, $\epsilon$, is introduced, so instead of returning the k nearest neighbours from a data set, the ANN search algorithm returns k points such that the ratio of the distance between the ith reported point ($1 \leq i \leq k$) and the true ith nearest neighbour is at most $1 \leq \epsilon$. We have found empirically that examining the 100 nearest neighbours yields a good balance between computational complexity and accuracy, and we set $\epsilon=2$, a value that only marginally lowers the accuracy while reducing computational time significantly.

Here, we examine the medial cartilage since OA is more often observed in this compartment (Dunn et al, 2004) and in particular in the medial tibial part (Kamibayashi et al, 1995), thus these compartments are of major interest when it comes to finding disease markers for OA. In order to separate different types of cartilage from one another we use a three class classifier, where the classes are tibial medial cartilage, femoral medial cartilage and background.

Figure 2:
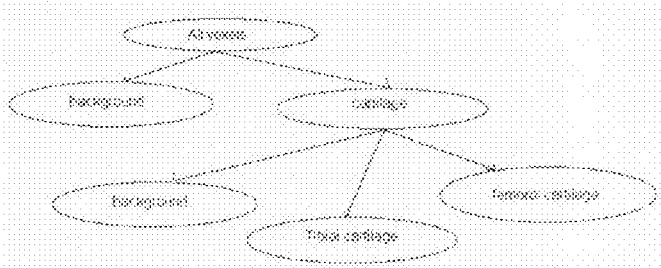
FIG. 2 shows a sketch of the hierarchical classification scheme used in segmentation of the above images.

The classification is hierarchical, and the first step is a two class classification where the voxels are roughly separated into cartilage or background. The kNN produces class probabilities for every voxel, and in this step we set the threshold at 0.65 yielding a sensitivity for medial cartilage close to 99%. This also results in a large amount of false positives, but since typically only a few percent of the total volume within the knee belongs to the cartilage, this first step is a way of reducing data significantly. In the second step, the voxels classified as cartilage in the first step are reconsidered. This time we use a three class classifier, where the three classes are tibial and femoral medial cartilage and background, and class membership is decided based on a majority vote. The three class classifier contains more features and the features are optimized to separate the three classes whereas the classifier in the first step has features optimized to separate cartilage from background. A sketch of the hierarchical classification scheme is illustrated in FIG. 2.

We have also tested a direct partitioning into the three classes, but the hierarchical approach yields better results and is faster, since the first step has less features and thus lower computational complexity. The classifier in the first step has a set of 33 features compared to the three class classifier in the second step that contains 51 features.

In order to find a feature set that performs well for our classification scheme, we here introduce our set of candidate features and the subsets of the features that were found from our feature selection method, which consists of sequential forward selection followed by sequential backward selection.

When a radiologist examines an MR scan for cartilage, she or he takes the location and the intensity in the image into consideration. We therefore consider these as candidate features.

One can also consider features that are related to the geometry of the object in question. The 3-jet, which is all first, second and third order derivatives with respect to (x,y,z) forms a basis which can describe all geometric features up to third order and are listed as candidate features. All the derivatives mentioned in this section are Gaussian derivatives and are defined as $$I_{i_1,\ldots,i_n} = \int \tilde{I}(\bar{x}) D_{i_1,\ldots,i_n} g(\bar{x},\sigma_1) d\bar{x}$$

where g is a Gaussian, D a differential operator and $\sigma_l$ is the scale.

Cartilage can be described as a thin curved disc in 3D. The Hessian (H), which is the symmetric matrix containing second order derivatives with respect to the coordinates (x,y,z), $$H = \begin{pmatrix} I_{xx} & I_{xy} & I_{xz} \\ I_{yx} & I_{yy} & I_{yz} \\ I_{zx} & I_{zy} & I_{zz} \end{pmatrix}$$

is therefore considered. The eigenvectors of the Hessian points in the directions of the principal curvatures and its eigenvalues correspond to the curvature in those directions. A thin disc such as cartilage will locally yield one large and two small eigenvalues. The eigenvalues as well as the three eigenvectors are candidate features.

A feature that has been shown to be significant in the detection of thin structures such as fingerprints is the structure tensor (ST). It is a symmetric matrix containing products of the first order derivatives convolved with a Gaussian, $$ST = G_{\sigma_2} * \begin{pmatrix} I_x I_x & I_x I_y & I_x I_z \\ I_y I_x & I_y I_y & I_y I_z \\ I_z I_x & I_z I_y & I_z I_z \end{pmatrix}$$

where $\sigma$ is not necessarily the same scale as the one used for obtaining the derivatives. The ST examines the local gradient distribution at each location (x,y,z). The directions of the eigenvectors depend on the variation in the neighbourhood. The eigenvalues and eigenvectors of the ST were considered as potential features with a combination of three scales of $\sigma_1$ and three scales of $\sigma_2$.

The third order derivatives with respect to (x,y,z) can be conveniently represented in the third order tensor $I_{ijk}$. Examining the third order structure in the local gradient direction $(I_x, I_y, I_z)$ can be described using Einstein summation as $$L_{www} = I_{ijk} I_i I_j I_k / (I_i I_i)^{3/2}$$

The third order tensor is examined in the gradient direction on three different scales, which were considered as possible features.

The features used in the two class classifier are the position in the image, the Gaussian smoothed intensities on three different scales (0.65 mm, 1.1 mm, 2.5 mm) and the raw intensities, the first order Gaussian derivatives on scales 0.65 mm and 2.5 mm, the eigenvalues and the eigenvector corresponding to the largest eigenvalue of the structure tensor with $\sigma_1=0.65$ mm and $\sigma_2=2.5$ mm, and the eigenvalues of the Hessian on scales 1.1 mm and 2.5 mm.

The features in the three class classifier consist of combinations of first, second and third order Gaussian derivatives on the three different scales mentioned, the Gaussian smoothed intensities on three different scales (0.65 mm, 1.1 mm, 2.5 mm) and the raw intensities, the position, the eigenvector corresponding to the largest eigenvalue of the ST with $\sigma_1=0.65$ mm and $\sigma_2=1.1$ mm, the eigenvalues of the ST with $\sigma_1=1.1$ mm and $\sigma_2=2.5$ mm, the eigenvalues of the Hessian on scales 1.1 mm and 2.5 mm.

The features selected as most significant are the Hessian and the structure tensor along with the intensity and the position in the image. The features were normalized between zero and one. Normalization for unit variance was also examined, but the normalization of values between zero and one produces slightly better results.

The placement of the knee varies slightly in clinical studies but is still a strong cue to the location of cartilage, which will be evident in the segmentation method described below, where the position in the scan is selected as one of the most significant features. Even though the global location is a strong cue the minor variation in placement is a source of errors. Segmentation methods that rely on manual interaction are usually less sensitive to knee placement. However, in an automatic system, it is desirable to eliminate manual labour in segmentation tasks and accordingly, placement variation is an issue that needs attention.

Figure 3:
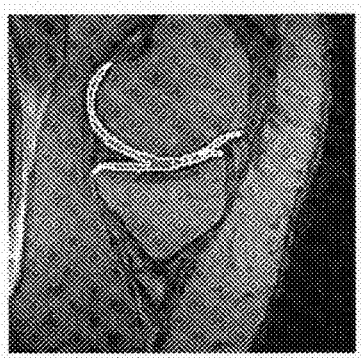
FIG. 3 shows a scan and corresponding segmented image most improved by position correction.
Figure 3:
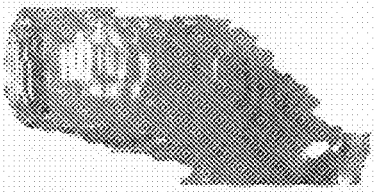
Figure 3:
Figure 3:
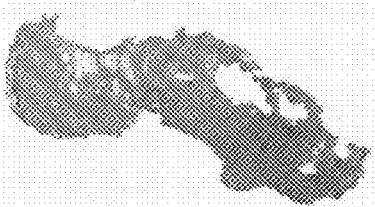
Figure 3:
Figure 3:
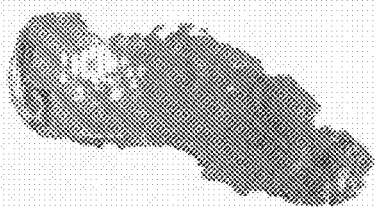
Figure 4:
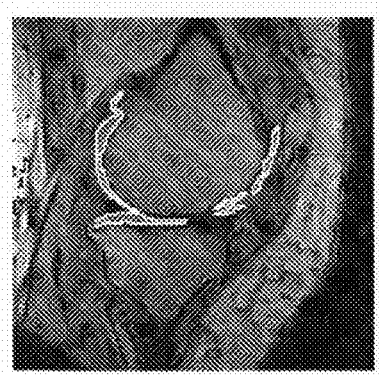
FIG. 4 shows a scan and corresponding segmented image illustrating the worst case scenario of position correction.
Figure 4:
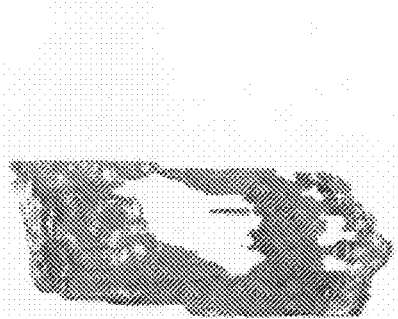
Figure 4:
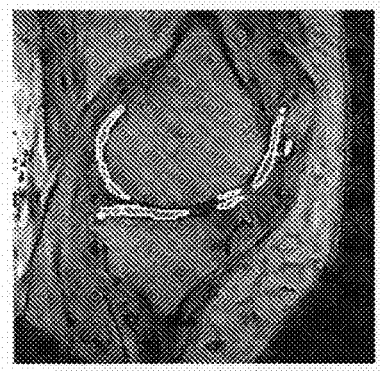
Figure 4:
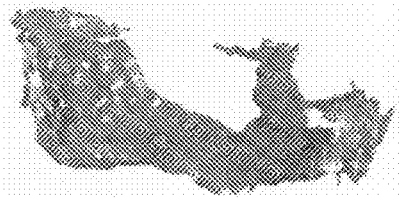
Figure 4:
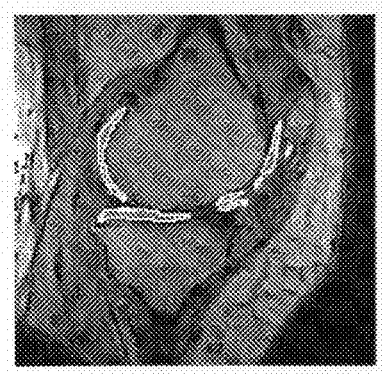
Figure 4:
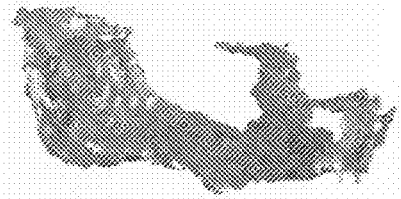

FIGS. 3 and 4 provide an illustration of how knee position in a scan can affect an automatic segmentation method. One way of correcting for knee placement is to manually determine where in the scan the cartilage is, but this can take time with 3D images since a human expert typically searches through the scans on a slice-by-slice basis. When the segmentation method itself is automatic, an automatic adjustment is preferred.

In order to adjust the segmentation method to become more robust to variations in knee placement, an iterative scheme, consisting of two steps, has been developed. First, the coordinates of the scan are shifted so that the cartilage centre of mass found from the segmentation is positioned at the location of the centre of mass for the cartilage points in the training set. Then the volume is re-classified with the other features unchanged and re-segmented.

The method is trained on 25 scans and evaluated on 114 scans. Of the 114, 31 knees have been re-scanned and the reproducibility is evaluated by comparing the first and second scanning.

The automatic segmentation yields an average sensitivity, specificity and DSC are 81.15 (+/−11.0% s.d), 99.9% (+/−0.04% s.d) and 0.79 (+/−0.07s.d) respectively in comparison with manual segmentations. As to inter-scan reproducibility of the volumes from the automatic segmentations, the linear correlation coefficient between the first and second scanning is 0.86 for the 31 knees, with an average volume difference of 9.3%.

The fully automatic segmentation requires 10 minutes of computation (on a standard 2.8 GHz desktop computer) using an optimised algorithm for voxel classification. The segmentation mean accuracy is evaluated to sensitivity 84.2% and specificity 99.9%.

After applying position normalisation, the average sensitivity, specificity and DSC are 83.9% (+/−8.37 s.d), 99.9% (+/−0.04% s.d) and 0.80 (+/−0.06% s.d) respectively and it converges in only one iteration. Compared to the initial segmentation there is a significant increase in sensitivity ($p<1.0*10^{-7}$) and in DSC ($p<2.5*10^{-3}$) according to a students t-test. In order to illustrate how the segmentations are affected, the best results shown in FIG. 3 are compared with the worst results from the position correction scheme shown in FIG. 4. In the best case the DSC increases with 0.17 and for the worst scan it decreases with 0.017.

FIG. 3 shows the scan most improved by the position correction scheme, where the DSC increases from 0.61 to 0.77. FIG. 3(a) shows the manual segmentation, (b) shows the original segmentation and (c) shows the segmentation after position correction. The 3D views are seen from above, and the 2D images are a sagittal slice of the segmentation.

FIG. 4 shows the worst case scenario of applying position correction where the knee is severely osteoarthritic (KLi=3). For this scan there is no improvement in DSC. The manual segmentation is shown in (a), (b) shows the initial segmentation and (c) shows the segmentation after position correction.

The reproducibility of the segmentation is improved with an increase of the linear correlation coefficient from 0.86 to 0.93 and the average volume difference decreases from 9.3% to 6.2%. These reproducibility values can be compared to the volumes from the manual segmentations by a radiologist for the same data set. The linear correlation coefficient is 0.95, and the radiologist has an average volume difference of 6.8%.

Figure 5:
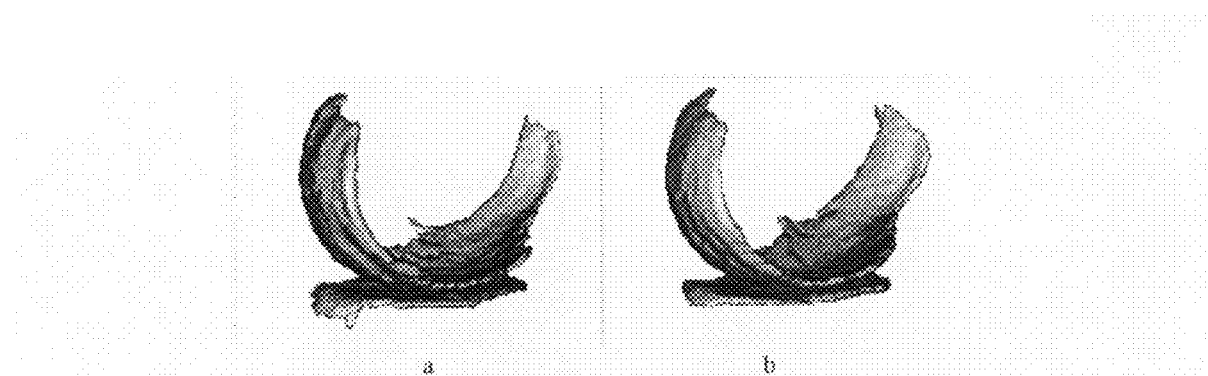
FIG. 5 shows (a) a three dimensional segmented MRI image produced below by manual segmentation of scan data and (b) a similar three dimensional segmented MRI image produced below by automatic processing of the same scan data.

From a subset of 71 scans from our collection we use 25 for training and 46 for the evaluation of our segmentation algorithm. The results of our automatic segmentation is compared to the manual segmentation made by radiologists, resulting in an average sensitivity and specificity of 90.0% and 99.8% respectively for the test set for the medial cartilage compartments. A comparison between gold standard segmentation and an automatically segmented knee MR scan can be seen in FIG. 5. In FIG. 5a is the manually segmented medial cartilage from a knee MR scan and in FIG. 5b the corresponding automatic segmentation. For this scan, the sensitivity and specificity are 94.82% and 99.79% respectively, with a dice of 0.81. A slice by slice comparison is displayed in FIG. 1. The dice similarity coefficient (DSC) measures spatial volume overlap between two segmentations, A and B, and is defined as $$DSC(A, B) = \frac{2 \times |A \cap B|}{|A| + |B|}$$

The Dice similarity coefficient between our automatic segmentation and the gold standard segmentation is for the test set on average 0.80.

Comparing our method with a competing semi-automatic segmentation algorithm (Pakin et al. 2002), we get a distinctly higher sensitivity and a slightly better specificity. Our segmentation algorithm performs well compared to two leading cartilage segmentation schemes, which demonstrates that fully automatic cartilage segmentation is achievable in low-field MR scanners.

A total of 114 scans of knees were taken of both left and right knees and used for validation and evaluation of the cartilage homogeneity quantifications. A week later 31 knees were rescanned for the precision and reproducibility study. The test subjects are both males and females aged between 21 and 72 years. They have no, mild or sever OA symptoms, diagnosed by radiologists as being 0,1,2 and 3 on the Kellgren and Lawrence Index (Kellgren & Lawrence 1957). Among the 114 test subjects 51 are healthy (KL:0) and 62 have OA (KL: 1-3).

We define cartilage homogeneity to be a measure of the variation of the intensities inside the cartilage compartment. To quantify homogeneity we calculate a number of measures of mean signal intensity and entropy of the signal intensities based on two different types of statistical methods.

The first order statistical methods rely on approximating the probability of observing a particular intensity at a randomly chosen location in the image. The measures are calculated form the grey scale histogram of the image defined by:

$$H(i) = \frac{n_i}{N}; \quad i = 0, 1 \ldots L-1$$

where N is the number of pixels in the image, $n_i$ is the number of occurrences for intensity i and L is the number of grey levels in the image. Using the equation for histogram we define the following measures:

$$\text{Mean (average intensity value): } \mu = \sum_{i=0}^{L-1} iH(i)$$

$$\text{Standard Deviation (contrast of image): } \sigma = \sqrt{\sum_{i=0}^{L-1} (i-\mu)^2 H(i)}$$

Uniformity (Energy of image): $\sum_{i=0}^{L-1} H(i)^2$

Entropy Normalised (randomness): $-\sum_{i=0}^{L-1} \frac{H(i)\log H(i)}{\log(q)}$ To ensure invariance to change in the image quantisation levels, we normalise entropy by $\log^1$ (base 2) of the quantisation levels (q=4096).

The second order statistical methods measure the joint probability distribution of pairs of voxels in the image. This involves the estimation of the discrete second-order probability function $C_{d\theta}(i,j)$ which represents the probability of occurrence of a voxel pair with grey levels i and N given the spacing between the pair of voxels is d along a given direction θ. $C_{d\theta}(i,j)$ is called the grey level co-occurrence matrix (GLCM). Due to the small size of the cartilage region we only consider the immediate neighbouring voxels. Furthermore to reduce the dimensionality we assume that the joint probabilities are direction independent. Therefore we have an averaged L×L GLCM where L is the number of grey levels in the image.

In order to quantify this spatial dependence of gray level values (Haralick, R. M., Shanmugam, K., Dinstein, I.) suggests 14 measures which are extracted from the GLCM. A subset of the four most relevant measures is chosen:

Contrast: $\sum_{i=0}^{L-1}\sum_{j=0}^{L-1}(i-j)^2 C[i,j]$

Homogeneity: $\sum_{i=0}^{L-1}\sum_{j=0}^{L-1}\frac{C[i,j]}{1+[i-j]}$

Correlation: $\sum_{i=0}^{L-1}\sum_{j=0}^{L-1}\frac{(i-\mu)(j-\mu)C[i,j]}{\sigma^2}$ Energy: $\sum_{i=0}^{L-1}\sum_{j=0}^{L-1} C[i,j]^2$ Accordingly, a population of test subjects was prospectively selected. The subjects were randomly selected such that the population had an even distribution between sexes and across ages. Furthermore, the subjects were selected for the study such that the number of healthy and subjects with OA symptoms were approximately equal. Subjects with previous knee joint replacement, inflammatory arthritis or presenting any contraindication for MRI examination were excluded prior to the study.

Thereby, we have a total of 114 manually segmented knee MR Images. For each knee we have the segmentations both for the tibial and the femoral medial cartilage. The values of the measures for both tibial and femoral in each image are calculated and the measures are grouped according to the KL values of the subjects: being healthy or having OA. To determine the amount of discrimination a measure provides we test the null hypothesis that the two distributions (healthy and OA) have the same mean using the t-test. The resulting p-value is the probability with which the hypothesis can be rejected. If this p-value is less than a chosen level of significance α then we will reject the null hypothesis. Using α=0.05 the following measures succeeded to discriminate healthy from OA: standard deviation, uniformity and entropy from first order statistics and contrast from second order.

| Measure | P-Value | Measure | P-Value |
|---|---|---|---|
| Volume | 0.002 | GLCM:Contrast | 0.007 |
| Mean | 0.1 | GLCM:Corrleation | 0.8 |
| standard deviation (σ) | 0.0000 | GLCM:Energy | 0.3 |
| Uniformity | 0.002 | GLCM:Homogeneity | 0.1 |
| Entropy | 0.0005 | | |

The table above lists the p-values for the hypothesis testing of all the first (left-hand column) and second (right-hand column) order measures calculated from manual segmentations of the tibial medial cartilage. The p-values are low suggesting that the measures can significantly discriminate healthy from OA. Volume of the knee cartilage is considered a good measure for monitoring OA progression. To assess and compare the discriminatory power of our measures we also include p-values for volume (volume of each cartilage is normalised by width of the subject's tibial plateau).

Figure 6:
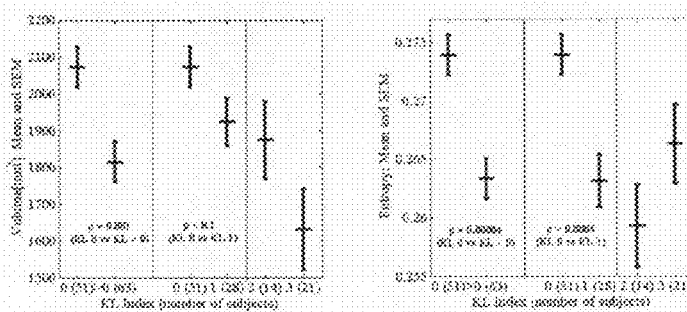
FIG. 6 shows a comparison of volume and entropy calculated on the full medial tibial cartilage sheet as a separator for healthy versus OA for manual segmentations of the tibial medial cartilage.

FIG. 6 shows the comparison between volume and entropy as a separator for healthy versus OA for manual segmentations of the tibial medial cartilage. The first part of each graph shows the error bars (which represent Standard Error of the Mean (SEM)) for healthy (KL:0) versus (KL:0-3). The second part shows the error bars for each group (KL:0-3) separately. We can see that entropy (p=0.0005) outperforms volume p=0.002 in separating healthy from OA. Furthermore it can also detect early stages of OA. That is by separating KL:0 from KL:1 (p=0.001).

| Type | Volume | Std dev (σ) | Uniformity | Entropy | GLCM:Contrast |
|---|---|---|---|---|---|
| Whole femur | 0.3 | 0.4 | 0.06 | 0.2 | 0.1 |
| Load bearing | 0.3 | 0.05 | 0.01 | 0.02 | 0.1 |

The first row of the above table shows the results for manual segmentations of the femoral medial cartilage. The first row shows the values for the whole femur while the second row shows the values for the load bearing region. The p-values are high which means that the method fails to discriminate. It has been shown that the accuracy of the thickness measurements from MR images is better in the weight bearing regions of the femoral cartilage. It is because the weight bearing region of the femur sustains contact with the tibial cartilage during the gait cycle. The load bearing region is approximated by the intersection between femoral cartilage and the result of applying a 3D morphological dilation operator to the tibial region 10 times.

Figure 7:
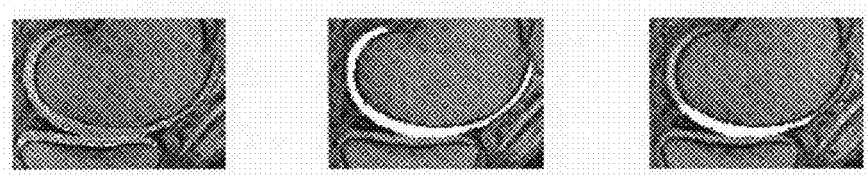
FIG. 7 shows a slice from a knee MR scan, in which the tibial medial and femoral medial cartilage is manually segmented by radiologists (a); a sagittal view of the segmented femur (b); and its load bearing region (c)

FIG. 7 shows a femoral medial cartilage and its segmented load bearing region. FIG. 7a shows a slice from a knee MR scan, in which the tibial medial and femoral medial cartilage is manually segmented by radiologists. FIG. 7b shows a sagittal view of the segmented femur and FIG. 7c shows its load bearing region. The second row of the above table shows the results for the load bearing region of the femoral medial region. All the subsequent results are calculated using only the load bearing region.

The above results can also be used in the assessment of disease progression in the same subjects. Specifically, the results above are obtained at baseline. The present inventors have shown that the measure of homogeneity in cartilage of a joint decreases over time as the disease progresses. Accordingly, the homogeneity measure described can be used to provide a biomarker that can separate healthy cartilage from that subjected to early osteoarthritis in a cross-section of the general public at any given time, and, the homogeneity measure can also be used to indicate the progression of disease over time.

In a specific example, a population was scanned at baseline and after 21 months using a Turbo 2D T1 sequence (flip angle 40°, TR 50 ms, TE 16 ms, scan time 10 minutes, resolution 0.7 mm*0.7 mm*0.8 mm) on a 0.18 T MRI Esaote scanner. At baseline there were 313 knees of which 25 were used for training of computer-based methods. The validation set had 288 right and left knees at baseline (subject aged: 21-81, females: 44%, BMI: 26.7±4.3) and 243 at follow-up. The knees were examined by radiography and categorised by the Kellgren and Lawrence Index (with distribution [145,88,30, 24,1] for KL 0-4). The medial compartments of the tibial and femoral cartilage sheets were segmented using a fully automatic voxel classification scheme and the cartilage volume and homogeneity were quantified.

Homogeneity was quantified by measuring entropy from the MRI signal intensities—specifically, areas of cartilage with fewer, more dominant intensities are quantified as being more homogenous. For precision evaluation, as above, 31 knees were re-scanned a week after baseline. The healthy subjects at baseline were divided into two groups: 1) 101 subjects that remained healthy at follow-up and 2) 25 subjects that progressed to early OA (KL 1). For each group both volume and homogeneity changes over the 21 month period were computed and the statistical significances based on an un-paired t-test were calculated.

Figure 8:
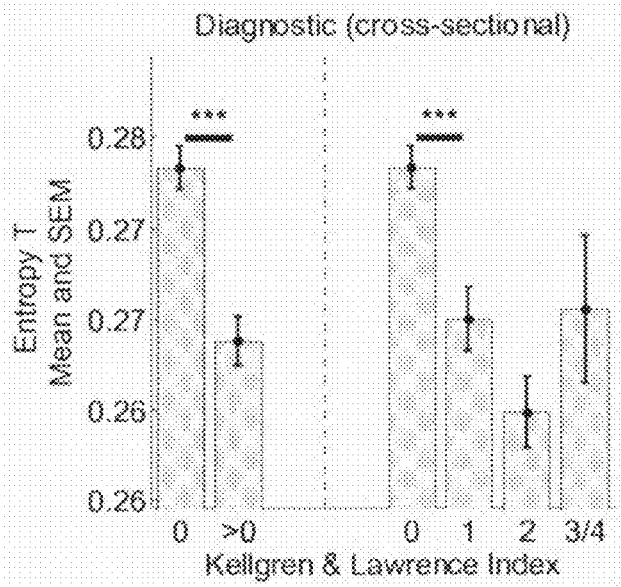
FIG. 8 shows a bar plot for entropy against KL index comparing entropy levels in normal and diseased cartilage.
Figure 9:
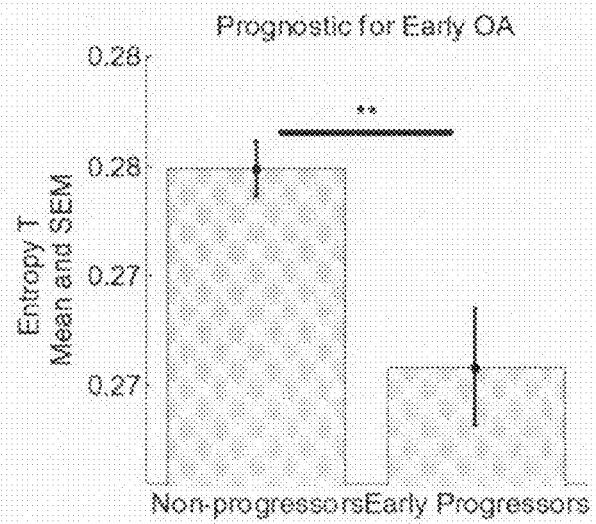
FIG. 9 shows a bar plot of baseline values in entropy for a population in which osteoarthritis has progressed and a population in which osteoarthritis has not progressed.
Figure 10:
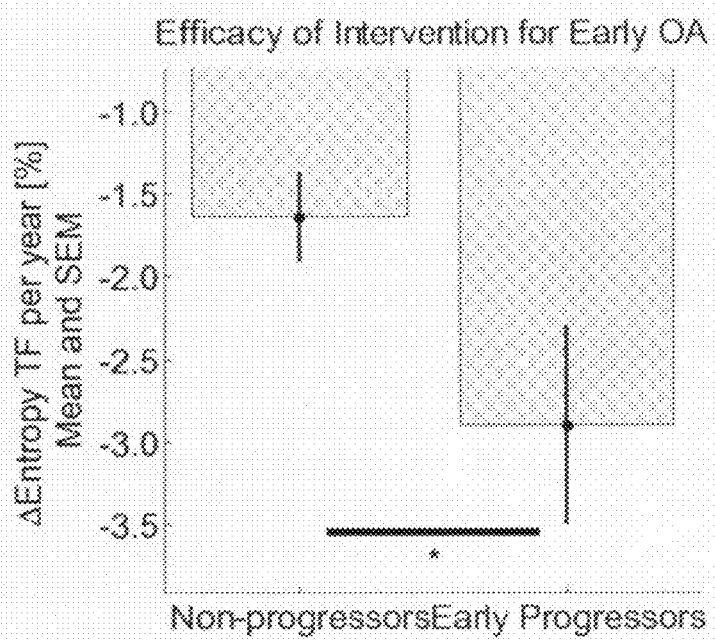
FIG. 10 shows a bar plot of percentage longitudinal change in entropy for a population in which osteoarthritis has progressed and a population in which osteoarthritis has not progressed.

The results are shown in FIGS. 8, 9 and 10. The scan-rescan precision of volume and homogeneity were 3.6% and 2.7% respectively. FIG. 8 shows a bar graph of entropy against the Kellgren & Lawrence Index. Specifically it shows entropy of healthy versus diseased cartilage and entropy at different degrees of the disease as defined using the Kellgren & Lawrence Index. FIG. 8 shows that homogeneity succeeds in separating healthy from early OA ($p<0.05$). FIG. 9 shows the prognostic for early OA. Specifically, FIG. 9 shows entropy of non-progressors versus early progressors. These results show that the method described above may be used as a Prognostic biomarker since the baseline entropy is able to separate healthy non-progressors from early progressors ($p=0.002$). FIG. 10 shows the percentage change in entropy levels 21 months after the baseline measurements were taken for cartilage where OA has progressed early and where OA has not progressed. FIG. 10 shows that homogeneity (entropy) succeeded ($p<0.05$) in separating cartilage in which OA has progressed from cartilage in which OA has not progressed. The decrease in volume (4.0%) for cartilage in which OA had progressed was less than the decrease in entropy (5.6%)—in particular relative to the respective measurement precision. The decrease in entropy for cartilage that has not progressed was attributed to the effects of aging.

In continuation of these results, we divide the cartilage in different regions to see which region contributes most to homogeneity discrimination. The following computations are done for manual segmentation of the tibial medial cartilage. However, the results for the automatic segmentation described below suggest the same conclusions.

Figure 11:
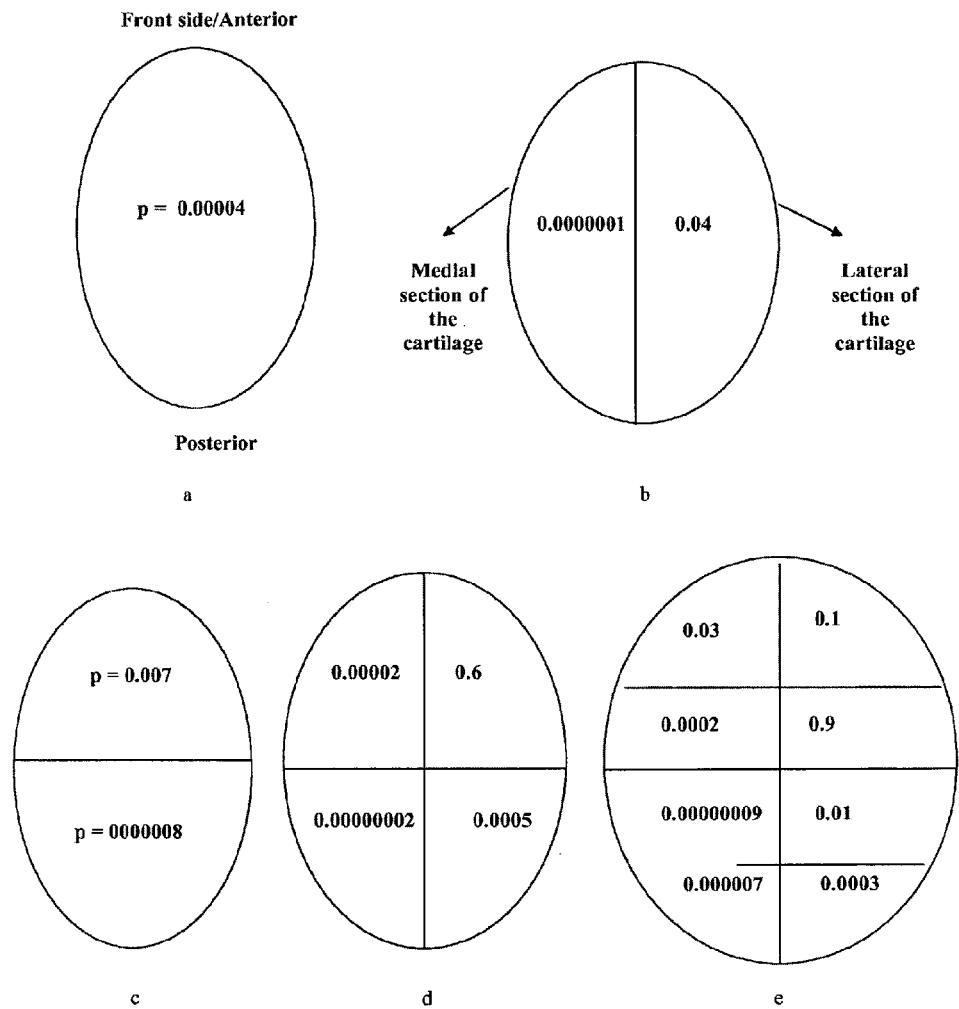

FIG. 11 shows an axial view of the medial tibial cartilage sheet. If we use all the intensities of the cartilage, as shown in FIG. 11a, when separating healthy from OA group using the measure entropy gives us a significance level of $p=0.00004$ (calculated using the t-test).

However, if as shown in FIG. 11b, we partition the cartilage in two equal halves in the sagittal plane then the distribution of p-values for entropy are $p=0.04$ in the lateral part near the centre of the knee and $p=0.0000001$ in the medial area away from the centre of the knee. It is therefore clear that the area away from the centre of the knee provides most discrimination. FIG. 12 shows a coronal and a 3D view of the partitioned cartilage where the darker region refers to the one which gives the most discrimination.

If, on the same pattern we do some more divisions and compute p-values for entropy of each region, the following results are obtained. If the cartilage is partitioned in two equal halves in a different direction as shown in FIG. 11c, the p-values are respectively $p=0.007$ and $p=0.0000008$. If the cartilage is further divided into equal quarters (Figure 11d), the p-values are respectively $p=0.00002$, $p=0.6$, $p=0.00000002$ and $p=0.0005$. Further division of the cartilage into eighths results in the following p-values (shown in FIG. 11e) $p=0.03$, $p=0.1$, $p=0.0002$, $p=0.9$, $p=0.00000009$, $p=0.01$, $p=0.000007$ and $p=0.0003$. It is clear from FIG. 11 and the results above that the region away from the centre of the knee is the one which contributes most to homogeneity.

Our results for this region, i.e. medial area of the medial tibial cartilage correlates with the observation that the cartilage often first breaks down in this region and this is what contributes to more homogeneity discrimination.

FIG. 13 shows error bar graphs for a better picture of entropy when calculated from this region alone. As before, the results are shown based on manual segmentations, however, similar results would be expected if the results were based on automatic segmentations.

It can be seen in FIG. 13 that this method is capable of separating healthy from OA knees and separating KL 0 from KL 1. Additionally, it can also separate KL 1 from the rest. FIG. 14 shows the results when automatic segmentation is used. It can be seen from the error bars shown that the same applies to automatic segmentation.

Thus, it has been shown above that calculating homogeneity from the medial part of the tibial medial cartilage leads to more homogeneity discrimination and results in improving our previous results. This area corresponds to the region of cartilage which often breaks down first during osteoarthritis (OA), and this could explain the better results.

Based on this principle, that certain regions of the segmented cartilage display stronger cartilage discrimination, we have devised the following region-partitioning algorithm.

We first divide each algorithm in 2D in the axial plane into squared regions each having the same size. The resolution of the division however, can vary. Then using a region shrinking technique we partition those regions that evaluate the objective function as being true. The objective function is finding the best p-value that can separate healthy (KL 0) individuals from individuals having OA (KL>0) based on the homogeneity measure. After the algorithm terminates we combine all regions of high discrimination as one single region and compute entropy for each knee. Finally we compute the p-value, which represents the significance level for the regions in separating healthy from OA.

To evaluate the accuracy/robustness of the partitioning algorithm with a particular focus on over-fitting we divide the original set of 114 knees randomly in two subsets (train and test) of 57 knees each, such that the KL distribution of each set resembles the initial set. We then execute the partitioning algorithm on the training set and using the resultant partitioned regions we compute the p-value for the test set. Over-fitting errors between the significance levels of train and test set are reduced by smoothing or regularising the partitioned regions. Three different regularisation approaches are evaluated. The first approach regularises the partitioned regions by applying geometric curve evolution by iterating the median filter. The second approach uses binary morphological filtering on the regions. The partitioned regions after regularisation are re-evaluated to get a significance level on the test set. The third approach uses the concept of bootstrap sampling. We do this by dividing the set of 114 knees in two sub-sets of 76 and 38 knees having the same KL distribution as the initial set. We keep the set of 38 knees for final evaluation. From the set of 76 knees we pick 38 knees randomly and perform partitioning on it. We repeat this 1000 times.

We then compute a Vote Map, i.e. for each individual region (number of total regions depends on the resolution) we count the number of times it was marked as being significant in the 1000 different trials. The Vote Map gives us the "importance" level of each region. To use the Vote Map we divide the set of 76 knees randomly 10 times in pairs of train and test sets of 38 knees each. We partition only those regions that are counted at least thresh (where 1<=thresh<=1000) times in the Vote Map. The Vote Map gives us the "importance" level of each region. We then threshold the Vote Map using thresh=500 that is we consider all the regions that have at least half the votes. Then the resulting regions are further regularized by applying geometric curve evolution by iterating the median filter. Alternatively, instead of regularizing with the median filter, we could for each level of thresh using the partitioned regions compute the p-value for the 10 different pairs of train and test sets and then pick a level at which the mean p-value of the train sets is minimum. This is illustrated in FIG. 15 for a Vote Map based on 100 trials. However, in the following, we use thresh=500 and perform further regularization by the median filter. Using this approach, we evaluate the regions on the set of 38 knees that were initially left out. We compare the resulting p-value with the significance of not using the partitioning algorithm on this set.

The results summarised in the table below are computed considering the whole cartilage sheet as one region, that is, without applying the partitioning algorithm. They show that measurement of cartilage entropy enables separation of healthy (KL 0) versus OA (KL>0), and in addition allows for separation of healthy from early OA (KL 1). FIG. 6 shows the comparison between volume and entropy as a function of the KL scale. Volume of each cartilage sheet is normalised by width of the subject's tibial plateau.

| Measure | Medial Tibial (p-value) |
|---|---|
| KL 0 vs KL 1 | |
| Volume | 0.1 |
| Entropy | 0.0004 |
| KL 0 vs KL > 0 | |
| Volume | 0.001 |
| Entropy | 0.00004 |

The results for executing the partitioning algorithm on 114 knees using arbitrarily chosen region sizes or resolutions are summarised in the table below.

| Resolution (rows × columns) | Entropy (p-value) |
|---|---|
| 2 × 5 | $6 \times 10^{-9}$ |
| 15 × 25 | $8 \times 10^{-14}$ |
| 74 × 136 | $9 \times 10^{-17}$ |

The mean size of the medial tibial cartilage sheet is 27×68 voxels. The results show that the regions partitioned by the algorithm enable a higher discrimination of homogeneity than using the whole cartilage (shown in the table above). Furthermore as we move to finer resolutions (sub-voxel accuracy) we obtain higher significance levels.

The results for the robustness test of the partitioning algorithm at different resolutions for three trials are shown below.

| Resolution | 1 Train | 1 Test | 2 Train | 2 Test | 3 Train | 3 Test |
|---|---|---|---|---|---|---|
| 2 × 5 | $3 \times 10^{-5}$ | $8 \times 10^{-5}$ | $6 \times 10^{-4}$ | $3 \times 10^{-6}$ | $4 \times 10^{-3}$ | $1 \times 10^{-4}$ |
| 15 × 25 | $3 \times 10^{-10}$ | $8 \times 10^{-5}$ | $3 \times 10^{-9}$ | $5 \times 10^{-6}$ | $2 \times 10^{-6}$ | $7 \times 10^{-7}$ |
| 74 × 136 | $3 \times 10^{-11}$ | $1 \times 10^{-6}$ | $4 \times 10^{-13}$ | $6 \times 10^{-6}$ | $1 \times 10^{-10}$ | $2 \times 10^{-6}$ |

The results show that at finer resolutions (e.g. 74×136) there is over-fitting. To overcome this we regularise the partitioned regions by using geometric curve evolution and morphological filtering. We observe that both techniques fail to reduce the difference between the p-values of test and train. However we succeed in minimising the difference between the two significance levels using the third technique of bootstrap sampling combined with curve evolution. Using the resulting regions after regularization we now get a significance level for the evaluation set of 38 knees. The table below shows the p-values for the evaluation set using the whole cartilage and using the regularised partitioned regions. It should be noted that the p-values shown in this table are higher than those above as this data set contains only 38 knees compared to the earlier data set of 114 knees.

| Type | p-value for homogeneity discrimination (separating healthy from OA) |
|---|---|
| Whole cartilage | 0.03 |
| Regularized region | $1 \times 10^{-3}$ |

We can see that even after regularisation, the results for the regularised regions are still more significant. FIG. 16 shows the different executions of the partitioning algorithm on the same cartilage under different resolutions. From this we can also see the effects of regularisation under high resolution partitioning. In short, the algorithm succeeds in finding regions that lead to much more significant results than compared to the whole cartilage. It can be seen in FIG. 16 that the areas shaded in light gray are the partitioned regions (of high homogeneity discrimination). It is clear from this that these regions are more towards the edges of the medial section of the cartilage.

FIG. 17 illustrates the results for the third technique of bootstrap regularization as applied in an extension of this study to encompass a further 169 scans from a further 88 subjects. FIG. 17(a) shows the Vote Map for the 80×140 resolution and FIG. 17(b) shows the resulting region of interest (the thresholded map). FIG. 17(c) also shows the region of interest in a sample knee cartilage sheet.

The following Table (last column) shows the p-values for separating the different groups when using the regularized region of interest on the full set of 283 knees. The precision of homogeneity for this region assessed as a test-retest root mean square coefficient of variation (RMS-CV %) was 3.3%. Table—P-values for separating groups of KL 0 from KL 1 and groups of KL 0 from KL>0 based on the two different measures. The first two columns of the table list the p-values for the previously described data set of 114 knees and the further data set of 169 knees respectively. The table also lists the p-value for the partition region from FIG. 17(c).

| Type | Entropy (114 knees) | Entropy (169 knees) | Volume (283 knees) | Entropy (283 knees) | Entropy (Partitioned) (283 knees) |
|---|---|---|---|---|---|
| KL 0 vs KL 1 | $3 \times 10^{-3}$ | $2 \times 10^{-3}$ | $6 \times 10^{-3}$ | $2 \times 10^{-5}$ | $5 \times 10^{-9}$ |
| KL 0 vs KL > 0 | $8 \times 10^{-4}$ | $4 \times 10^{-5}$ | $7 \times 10^{-6}$ | $1 \times 10^{-7}$ | $1 \times 10^{-15}$ |

The region of interest resulting from the bootstrap regularized partitioning based on homogeneity results in the above study and on an extension of that work involving a larger number of knee scans was far from corresponding to the central, load-bearing part of the cartilage—rather it outlines the peripheral part of the cartilage. The region that is being partitioned appears to correspond to the cartilage covered by the meniscus (FIG. 17). The menisci are wedge shaped cartilages that are interposed between the femoral condyles and the tibial plateau. The meniscus helps in stabilizing and assisting in the distribution of large loads across the joint. Several studies have highlighted the importance of the meniscus in the development of OA. It has been shown that damage and loss to the meniscus affects the articular cartilage as shown by the increased risk of developing OA after meniscectomy. Furthermore, it was recently shown that meniscal tears and extrusions appear to be associated with progression of knee osteoarthritis and a strong association has been shown between meniscal tears and cartilage loss. It has also been shown that there is considerable difference in the mechanical properties, e.g. load bearing properties, of the cartilage covered by the meniscus and the central region not covered by it.

Our automatic approach partitioned the region seeking out that part which is statistically most significant in separating groups of healthy subjects versus OA based on homogeneity without any prior assumption of the significance of the meniscus. Thereby our results demonstrate that the meniscal region of the cartilage is informative when evaluating the disease and particularly when monitoring early OA, as the region has proved to be quite significant when separating groups of healthy subjects from early OA. It should be noted here that the region was partitioned while minimizing the p-value for separating groups of healthy subjects from those having OA, therefore the fact that it could also significantly separate early OA further highlights the importance of the region.

This cross sectional study does not rule out that increased homogeneity is a genetic disposition for early OA. This observation is further nurtured by the fact that entropy seem to be indistinguishable between KL1 through 3, albeit they all were significantly different from the group of healthy.

The results show that cartilage entropy provides sensitivity and information beyond that of volume quantifications. Specifically, cartilage homogeneity, measured by entropy, is able to detect early OA and separate healthy individuals from diseased with a higher statistical significance than volume. Our automatic partitioning algorithm outlines the regions on the cartilage that separates healthy from OA on the basis of homogeneity. We have shown that OA affects certain regions of the cartilage more rapidly and distinctly, and these regions are more towards the medial section and at the edges of the cartilage. These results should provide valuable clues in the detection of OA and thus may improve treatment efficacy.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'.

References

Arya, S., Mount, D., Netanyahu, N., Silverman, R., Wu, A.: An optimal algorithm for approximate nearest neighbor searching in fixed dimensions. In: ACM-SIAM. Discrete Algorithms. Number 5 (1994)

Buckland-Wright, J., Lynch, J., Macfarlane, D.: 'Fractal signature analysis measures cancellous bone organization in macroradiographs of patients with knee osteoarthritis' Annal of Rheumatological Diseases 55 (1996b) 749-755

Ding, C., Garnero, P., Cicuttini, F., Scott, F., Cooley, H. & Jones, G. (2005), 'Knee cartilage defects: assofication with early radiographic osteoarthritis, decreased cartilage volume, increased joint surface area and type ii collagen breakdown', *Osteoarthritis and Cartilage* 13.

Dunn, T., Lu, Y., Jin, H., Ries, M. & Majumdar, S. (2004), 'T2 relaxation time of cartilage at mr imaging: comparison with severity of knee osteoarthritis', *Radiology* 232(2).

Grau, V., Mewes, A. U. J., Alcaniz, M., Kikinis, R. & Warfield, S. K. (2004), 'Improved watershed transform for medical image segmentation using prior information', *IEEE Trans. of Medical Imaging* 23(4).

Haralick, R. M., Shanmugam, K., Dinsein, I.: 'Textural features for image classification' IEEE Transactions on Systems, Man, and Cybernetics SMC-3 (1973) 610-621

Jones, G., Ding, C., Scott, F., Glisson, M. & Cicuttini, F. (2004), 'Early radiographic osteoarthritis is associated with substantial changes in cartilage volume and tibial bone surface area in both males and females', *Osteoarthritis and Cartilage* 12(2).

Kamibayashi, L., Wyss, U., Cooke, T. & Zee, B. (1995), 'Changes in mean trabecular orientation in the medial condyle of the proximal tibia in osteoarthritis', *Calcif Tissue Int.* 57(1).

Kellgren, J. & Lawrence, J. (1957), 'Radiological assessment of osteo-arthrosis', *Ann Rheum Dis* 16(4).

Koo, S., Gold, G. & Andriacchi, T. (2005), 'Considerations in measuring cartilage thickness using mri: factors influencing reproducibility and accuracy', *Osteoarthritis and Cartilage* 13.

Liess, C., Liisse, N. Karger, M. Heller, and C.-C. Glüer: Detection of changes in cartilage water content using MRI T2-mapping in vivo. Osteoarthritis and Cartilage, Volume 10, 2002.

Lusse, H Claassen, T Gehrke, J Hassenpflug, M Schunke, M Heller, CC Glüer: Evaluation of water content by spatially resolved transverse relaxation times of human articular cartilage. Magnetic Resonance Imaging, Volume 18, issue 4, 2000.

Lynch, J. A., Zaim, S., Zhao, J., Stork, A., Peterfy, C. G. & Genant, H. K. (2001), Automatic measurement of subtle changes in articular cartilage from mri of the knee by combining 3d image registration and segmentation, in 'SPIE, Medical Imaging', Vol. 4322.

Mosher T. J., Yi Liu, Qing X. Yang, Jing Yao, Ryan Smith, Bernard J. Dardzinski, and Michael B. Smith: Age Dependency of Cartilage Magnetic Resonance Imaging T2 Relaxation Times in Asymptomatic Women. Arthritis & Rheumatism, Volume 50, Number 9, 2004.

Naish, J. H., Vincent, G., Bowes, M., Kothari, M., White, D., Waterton, J. C., Taylor, C.: 'A method to monitor local changes in mr signal intensity in articular cartilage: A potential marker for cartilage degeneration in osteoarthritis' MICCAI 3217 (2004) 959-966

Pakin, S. K., Tamez-Pena, J. G., Totterman, S. & J. Parker, K. (2002), Segmentation, surface extraction and thickness computation of articular cartilage, in 'SPIE, Medical Imaging', Vol. 4684, pp. 155-166.

Smith H E, T J Mosher, B J Dardzinski, B G Collins, C M Collins, Q X Yang, V J Schmithorst, M B Smith: Spatial variation in cartilage T2 of the knee. Magnetic Resonance Imaging, Volume 14, issue 1, 2001.

Stammberger, T., Eckstein, F., Michaelis, M., Englmeier, K.-H. & Reiser, M. (1999), 'Interobserver reproducibility of quantitative cartilage measurements: Comparison of b-spline snakes and manual segmentation', *Magnetic Resonance Imaging* 17(7).

Tamez-Pena, J. G., Barbu-McInnis, M. & Totterman, S. (2004), Knee cartilage extraction and bone-cartilage interface analysis from 3d mri data sets, in 'SPIE, Medical Imaging', Vol. 5370.

The invention claimed is:

1. A method for the analysis of three dimensional image data representing an articular cartilage to extract a quantitative parameter indicative of joint pathology, which method comprises determining from the data a measure representative of cartilage homogeneity, and further comprising comparing the measured value for the joint with measured values previously established in respect of healthy joints and/or in respect of joints characterised by a pathology, wherein said measure representative of cartilage homogeneity is the entropy, the mean, the standard deviation or the uniformity of measured intensities within a region of interest of the image.

2. A method as claimed in claim 1, wherein said measure is the entropy of the measured intensities within the region of interest.

3. A method as claimed in claim 1, further comprising partitioning the region of interest into at least two sub-regions and comparing the measured value representative of homogeneity obtained from the sub-region that has previously been found to best discriminate between healthy joints and joints characterised by a pathology.

4. A method as claimed in claim 1, further comprising regularising data representative of said measured intensities within said region of interest to enhance measurements derived from said signals.

5. A method as claimed in claim 1, wherein said region of interest lies in a load bearing area of said cartilage.

6. A method as claimed in claim 1, wherein said cartilage is a knee cartilage.

7. A method as claimed in claim 6, wherein said knee cartilage is a tibial cartilage.

8. A method as claimed in claim 7, wherein said tibial cartilage is a medial tibial cartilage.

9. A method as claimed in claim 8, wherein said partitioned region within said region of interest is a medial area of the medial tibial cartilage.

10. A method as claimed in preceding claim 1, wherein a comparison of said quantitative parameter is made both with values of the quantitative parameter previously established in respect of healthy joints and with values of said quantitative parameter previously established in respect of joints characterised by a pathology.

11. A method as claimed in claim 1, wherein said pathology is osteoarthritis, rheumatoid arthritis, villonodular synovitis, Lipoid dematoarthritis (Multicentric reticulohistiocytosis), Enteropathic arthritis, hemophilia (intraarticular bleeding), Gout, Familial Mediterranean fever, Pseudogout, Ochronotic arthropathy, Secondary osteoarthritis, Syphilis (tabes dorsalis), Pyrogenic arthritis, Tuberculous arthritis or Fungal arthritis.

12. A method as claimed in claim 1, wherein said three dimensional scan data is produced by magnetic resonance imaging (MRI).

13. A method as claimed in claim 1, wherein the quantitative parameter is calculated from the medial part of the tibial medial cartilage.

14. A method as claimed in claim 1, further comprising analysing said scan data to perform an automatic segmentation of image data representing cartilage from bone and other background prior to extracting said quantitative parameter.

15. A method as claimed in claim 1, wherein a value for said quantitative parameter which is indicative of more homogeneity than that established for healthy joints is taken as indicative of probable joint pathology.

16. A method as claimed in claims 1, further comprising determining from three dimensional image data representing the same articular cartilage at a subsequent period in time a second said measure representative of cartilage homogeneity and comparing said second measure with the measure determined from the earlier data, wherein a change in the measure representative of cartilage homogeneity is indicative of progression of osteoarthritis.

17. A method as claimed in claims 1, wherein the measure representative of cartilage homogeneity is used as a prognostic biomarker of early osteoarthritis.

* * * * *